//  US006018381A

United States Patent [19]
Vanderbrook et al.

[11] Patent Number: 6,018,381
[45] Date of Patent: Jan. 25, 2000

[54] METHOD FOR CALIBRATING A PHOTOFINISHING SYSTEM AND COMPONENTS FOR USE IN SUCH A METHOD

[75] Inventors: Peter Vanderbrook, Rush; Geoffrey John Woolfe, Penfield, both of N.Y.

[73] Assignee: Eastman Kodak Company, Rochester, N.Y.

[21] Appl. No.: 08/794,220

[22] Filed: Jan. 30, 1997

[51] Int. Cl.[7] ............................. G03B 27/80; G03B 27/72
[52] U.S. Cl. ................................................ 355/38; 355/40
[58] Field of Search .................................. 355/35, 38, 40, 355/41, 68, 71, 72, 32

[56] References Cited

U.S. PATENT DOCUMENTS

| | | | |
|---|---|---|---|
| 3,292,488 | 12/1966 | Griffith | 88/24 |
| 3,674,364 | 7/1972 | Korman | 355/38 |
| 3,797,933 | 3/1974 | Sable | 355/35 |
| 4,611,918 | 9/1986 | Nishida et al. | 356/404 |
| 4,970,584 | 11/1990 | Sato et al. . | |
| 5,053,808 | 10/1991 | Takagi | 355/68 |
| 5,083,154 | 1/1992 | Terashita et al. . | |
| 5,223,891 | 6/1993 | Fierstein et al. | 355/77 |
| 5,262,821 | 11/1993 | Hosoya | 355/35 |
| 5,313,251 | 5/1994 | Fierstein et al. | 355/77 |
| 5,357,315 | 10/1994 | Suzuki | 355/77 |
| 5,461,458 | 10/1995 | Fuersich et al. | 355/77 |

FOREIGN PATENT DOCUMENTS

| | | |
|---|---|---|
| 969 400 | 6/1975 | Canada . |
| 0 565 283 A1 | 10/1993 | European Pat. Off. . |
| 0 578 203 A1 | 1/1994 | European Pat. Off. . |
| 0 674 429 A2 | 9/1995 | European Pat. Off. . |
| 0 751 420 A1 | 1/1997 | European Pat. Off. . |
| 196 25 640 A1 | 6/1996 | Germany . |
| 9-15760 | 1/1997 | Japan . |
| 9-15761 | 1/1997 | Japan . |

OTHER PUBLICATIONS

Color Printing Techniques, "Analyzing Your Results: Prints from Negatives", The Kodak Workshop Series by Vernon Iuppa and John Smallwood, 1981, pp.26–37.

"Film Printing Demonstration Kit" Research Disclosure, No. 325, May 1, 1991, p. 366 XP000229721.

Primary Examiner—Safet Metjahic
Assistant Examiner—Michael Dalakis
Attorney, Agent, or Firm—Frank Pincelli

[57] ABSTRACT

An apparatus for calibrating a printer of a photofinishing system, comprising:

(a) a reference film strip carrying at least one reference image;

(b) a reference chart carrying multiple renderings of the reference image representing different printer exposures; and (c) a substrate carrying printer correction factors needed to change a photographic print obtained from the reference image on the reference film strip, to match any desired rendering on the reference chart. A method of producing the above reference chart, and a method of calibrating a printer of a photofinishing system, are also provided.

14 Claims, 4 Drawing Sheets

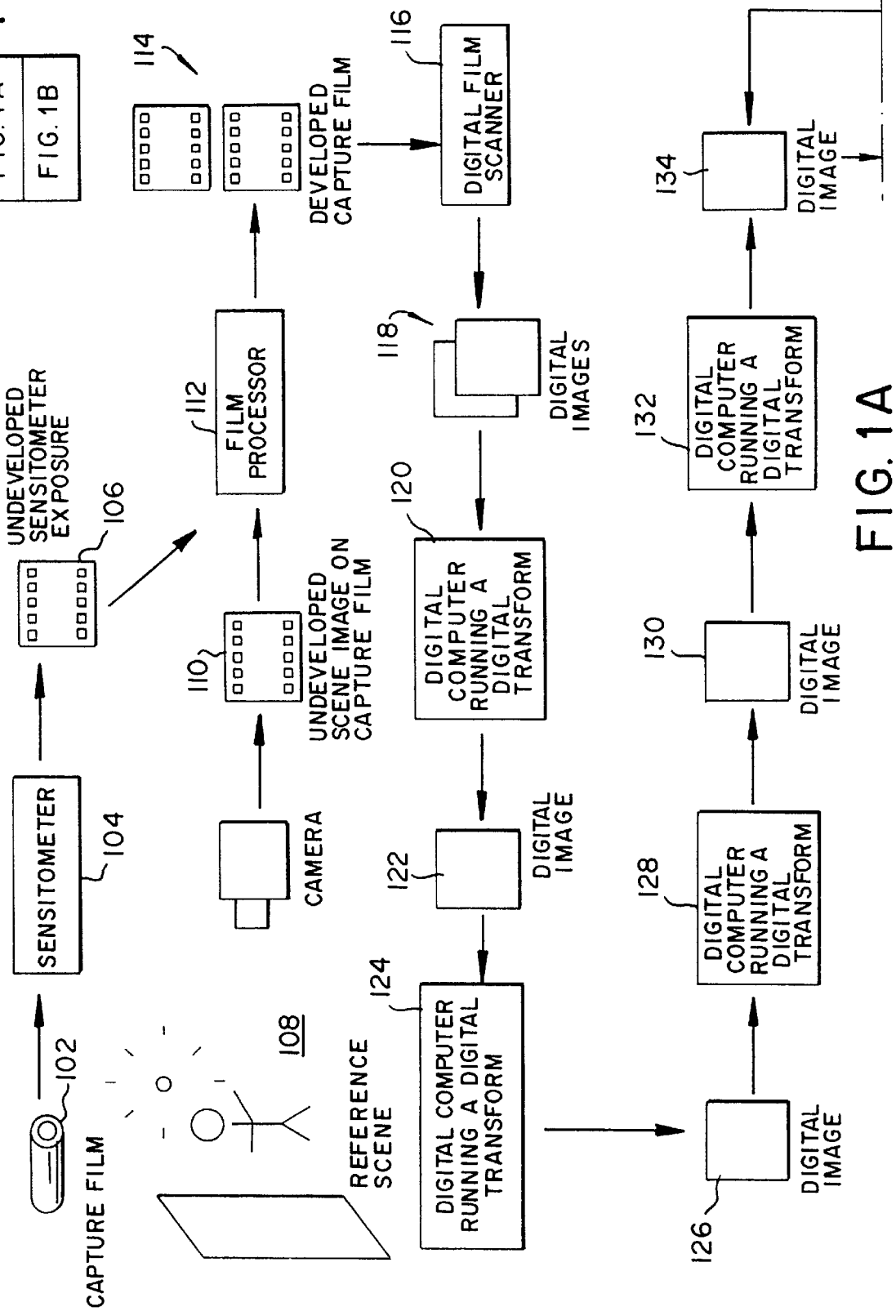

METHOD FOR CALIBRATING A PHOTOFINISHING SYSTEM AND COMPONENTS FOR USE IN SUCH A METHOD

FIELD OF THE INVENTION

The present invention relates in general to photofinishing systems and is particularly directed to a device (kit) and method which allows simple calibration of a photofinishing system printer.

BACKGROUND OF THE INVENTION

Photofinishers customarily employ one or more quality control tools, typically in the form of either reference first or second generation original developed negatives. "First generation" and "second generation" original negatives are described in U.S. Pat. Nos. 5,223,891 and 5,313,251. These developed reference images frequently consist of human portrait images and reference color or neutral gray patches. Photofinishers have typically calibrated their printers by printing these developed negatives, measuring the densities of reference patches on the resulting prints using a densitometer, and adjusting printer calibration controls until the densities of the reference patches reach recommended (desired) values.

Originally, these reference images were camera originals (that is, first generation originals) and were specified to extremely high standards. Because of these high standards, the production of them was time consuming, labor intensive and expensive. The adoption of second generation originals as control tools (as disclosed in U.S. Pat. Nos. 5,223,891 and 5,313,251), helped to address the above issues and also facilitated:

a. Identical images on multiple copies of a reference developed film strip.
 b. Higher standards of sensitometric uniformity between multiple copies of a reference developed film strip.

The calibration of printers using second generation originals was still generally achieved by measuring the reflection densities of a calibration patch in the image and comparing those densities to specified aim densities provided with the control tool. A less formal method of calibration involved repeatedly printing the image after adjustment of the printer balance until a pleasing result, possibly matching a single reference print, is obtained.

However, the previously used methods have a number of disadvantages. First, if the desired result is not obtained when the reference images are printed, there is no indication of how the printer should then be adjusted to obtain the desired result. Adjustments are usually made by trial and error, the number of trials required depending on the experience and color discrimination of the operator. Second, if calibration is achieved by visual matching to a supplied reference print, that reference print is the only available aim reference available. This aim may not reflect the color balance or density desired by the photofinisher. Third, if calibration is achieved by densitometric measurements of a calibration patch, while that patch can be adjusted perfectly there is a trade off in obtaining the desired rendering of the calibration patch (such as a typical gray patch) compared to other important colors in the scene. Fourth, because processed negatives were used, this method of calibration failed to take account of any bias or offset in the film processing components (that is, the physical and chemical components of the film developing process) between the film process used by the calibration kit manufacturer to develop the reference film strip and the film processing components used by the photofinisher to develop customer negatives from a customer film strip.

SUMMARY OF THE INVENTION

The present invention, then, provides an apparatus for calibrating a printer of a photofinishing system, comprising:

(a) a reference film strip carrying at least one reference image;
 (b) a reference chart carrying multiple renderings of the reference image representing different printer exposures; and
 c) a substrate carrying printer correction factors needed to change a photographic print obtained from the reference image on the reference film strip, to match any desired rendering on the reference chart.

The present invention further provides a method of making a reference chart useful in the above apparatus, and a method of calibrating a printer of a photofinishing system using the apparatus.

The apparatus and method of the present invention can provide a number of advantages. First, when a desired rendering is not obtained when the reference images are printed, the apparatus provides a quantitative indication of how the printer should then be adjusted to obtain the desired rendering. Second, a large number of different color balances and density renderings can be available on the reference chart and the photofinisher may select any one of these as his desired aim. Third, because calibration is primarily achieved by visually matching an ideal compromise between balance and density of all important elements in the reference scene can be more easily achieved. Fourth, because unprocessed negatives are used, the method of the present invention takes account of any bias or offset in the film processing components of the photofinisher.

BRIEF DESCRIPTION OF THE DRAWINGS

FIGS. 1A and 1B show a flowchart illustrating the method of the present invention used to prepare a reference chart;

To facilitate understanding, identical reference numerals have been used, where possible, to designate identical elements that are common to the figures.

EMBODIMENTS OF THE INVENTION

Figure 1B:
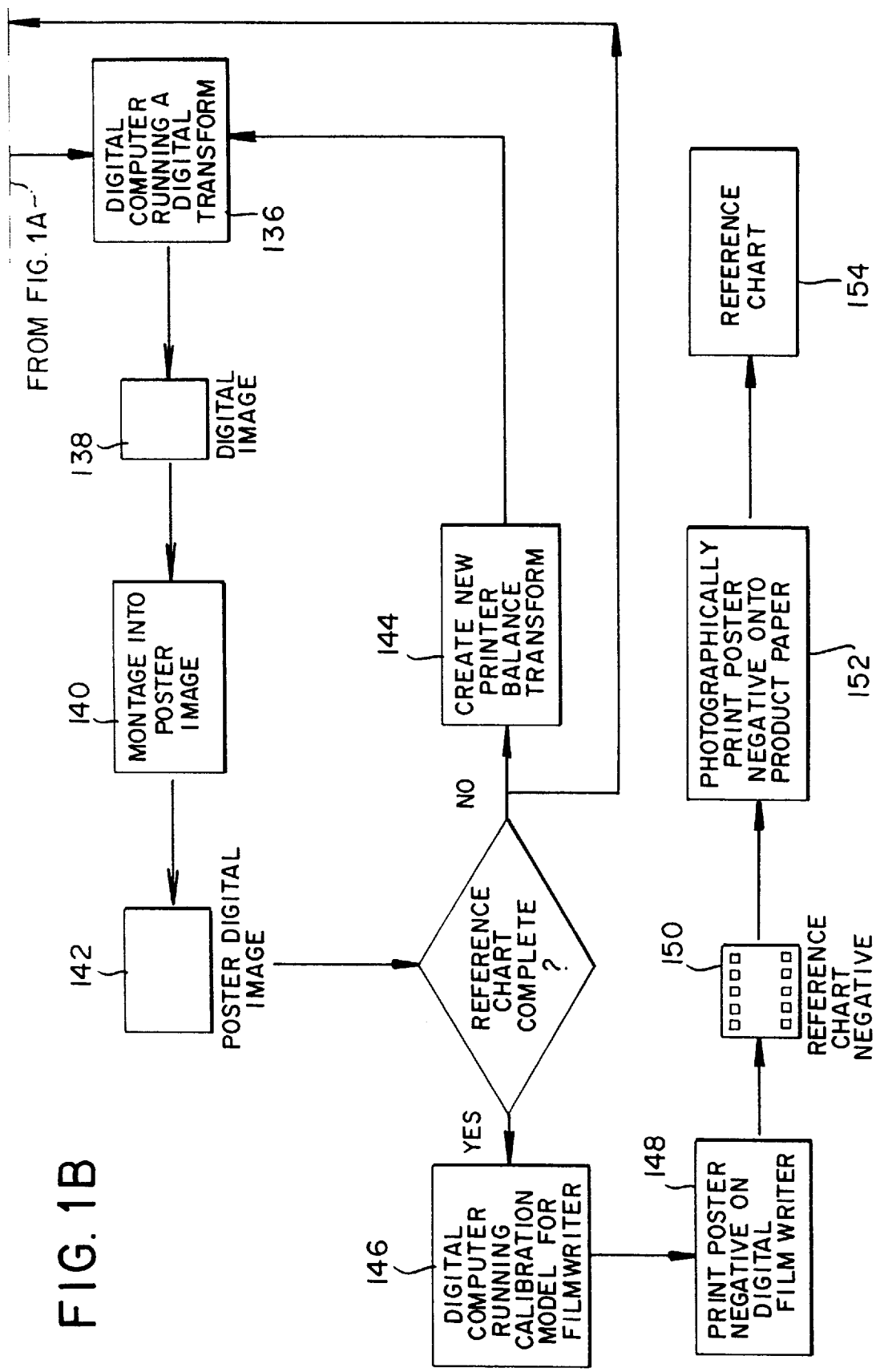

Referring first to FIGS. 1A and 1B, a capture film, 102, on which the original image, 110, of the scene, 108, is captured, is selected. Preferably the capture film 102 should have wide exposure latitude, high sharpness and good color rendition. This film is used to photograph the reference scene, 108. Additional exposures of the reference scene 108 are also made with the inclusion of various diagnostic charts and devices. Further analytical exposures are additionally produced on the capture film using an exposing device such as a sensitometer, 104, to produce undeveloped sensitometer exposure 106 on the same capture film 102. Since each of the separate photographic and sensitometric exposures on the capture film is used in the determination of the tone and color characteristics of the developed reference scene photograph, they are developed together in a well controlled film processor, 112, in the conventional manner.

The developed reference scene photograph and diagnostic and sensitometric exposures, 114, are scanned using a digital film scanner, 116. Optimum quality requires the use of a scanner having very high spatial resolution and stable color sensitivities. The resulting digital images, 118, are in a metric that is scanner dependent and will be called scanner density in this discussion. Scanner density is representative of the opto-electronic response of the scanner system to the optical density modulation in the developed negatives.

The digital image data (files) resulting from scanning the diagnostic and analytical exposures are then numerically analyzed. The developed negatives of the sensitometric exposures are also measured using appropriate integral densitometry. The data obtained is then used to determine the capture film and scanner characteristics and thereby construct a digital data transform, 120, that removes the scanner characteristics (such as spectral sensitivity) and the tone and color reproduction characteristics of the capture film from the scanned reference image. The components of such a transform may include, but need not be limited to, particular one-dimensional mapping operations, multi-dimensional lookup tables, matrix operations, interpolation operations, sampling operations, clipping, shifting and scaling operations, the uses of which are familiar to those skilled in the art of digital image processing or other types of data transforming operations. The digital image, 122, resulting from application of transform 120 is now a representation of the reference scene in terms of exposure density into the three color records of the capture film. Exposure density is a logarithmic quantity representing the imagewise quantity of exposing light reaching each photosensitive record of the capture film. Thus the digital image 122 in exposure density is independent of the color and tone reproduction characteristics of the capture film but is still dependent on the spectral sensitivities of the various photosensitive records of the capture film. That is, digital image 122 carries independent color signals corresponding to the signals sensed in each color channel of the capture film 102 (typically the signals may be in the form of red, green and blue signals, corresponding to the signals sensed by the cyan, magenta and yellow sensitive records of film 102).

Digital image 122 can now be manipulated if desired to change certain image characteristics or to add specific resolution targets or color calibration patches. This is accomplished using digital transform 124, leading to digital image 126, containing the (possibly modified) reference image with added resolution targets or color calibration patches.

If the product film type (the product film type being the type of film for which a calibration kit using the final reference chart, is being designed), has a different spectral sensitivity in its photosensitive record(s) than capture film 102, then it is necessary to develop a second transform, 128 which can transform the exposure densities as sensed by the capture film into exposure densities that would have been sensed by the product film type, producing digital image 130. Spectral sensitivity measurements for the photosensitive recording layers of the capture film 102 and the product film type are required to build this transform. These spectral sensitivities can be obtained in a known manner.

Digital image 130 must now be transformed in a way that digitally models the printing of a negative of the reference image on the product film onto the product photographic paper (a selected type of photographic medium), using a photofinishing system printer, to produce a photographic print of preselected balance. This is accomplished using digital transform 132. The resulting digital image, 134, represents the exposures that would be recorded in each photosensitive layer of the product photographic paper at the time of printing, if the printer were correctly balanced and calibrated. The data required to construct transform 132 include spectroscopy and integral densitometry readings of a set of images of color patches on the product film, where the set of color patches represents a reasonably uniform sampling of the color gamut of the film, the power spectrum of the printer lamp and the spectral sensitivities of the various photosensitive layers of the product photographic paper.

Figure 2A:
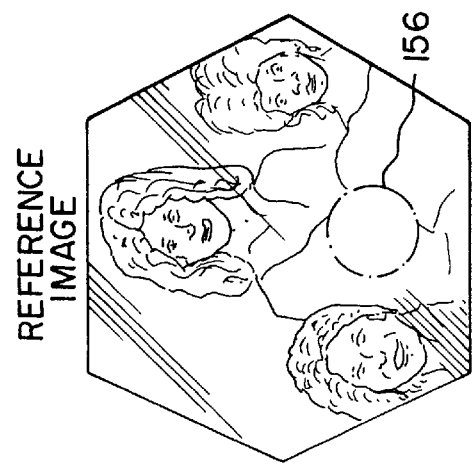
FIG. 2A is an enlarged view of a rendering on the chart of FIG. 2.

Digital image 134 is the basis image from which the reference chart is constructed. Steps 136 through 144 are repetitively applied to build each of the component images for the reference chart Digital transform 136 models a photofinishing system printer exposure adjustment (which includes both chromaticity, that is color balance, adjustments, as well as lightness adjustments), so that different exposure levels of the image can be generated which can produce photographic prints on the selected medium (the product type photographic paper) of balances (both color and lightness) offset from the preselected balance. This model can be derived from a study of the printer exposure adjustment mechanisms. Digital transform 136 also provides for the incorporation of unique reference identifiers (in the form of numbers 1 to 37, and letters A through H and N, as seen on FIG. 2) associated with each rendering on the reference chart "Associated with" means it is apparent on the printed image which identifier goes with which image. In the case of reference chart 154, the unique identifier is printed as part of each rendering (such as the unique identifier "1" shown in FIG. 2A). Digital image 138 represents represents the exposures that would be recorded in each photosensitive layer of the product photographic paper at the time of printing, for a preselected printer exposure or color balance position. The digital image 138 can be montaged (that is, integrated) at a preselected location into a larger digital image representing the whole reference chart 154. Digital image 142 represents the image of the reference chart at various stages of completion, as the component images, 138, are integrated into it. Step 144 represents the creation of a new digital transform 136 corresponding to a new printer exposure or color balance setting. When all of the component images of the reference chart have been created and integrated into the reference chart image, 142, it is transformed by digital transform 146. Transform 146 converts the reference chart image into a metric suitable for a digital opto-electronic film writer and provides for tone and color calibration of the filmwriter. The digital filmwriter outputs the digital image of the reference chart, 148, producing a film negative 150 of the reference chart, 154. This negative 150 is on a film suitable for use in the digital film writer and may be different from either the capture film or the product film. Negative 150, however, prints in a single exposure onto the product paper, exactly (within the limits of modeling error) as would a negative of the reference image, on the product film type, printed at the range of exposure and color balance settings represented on the reference chart. The negative of the reference chart is printed photographically, 152, onto the product paper using a photographic printer or enlarger resulting in the reference chart 154.

Reference chart 154 is a chart with 45 different renderings of the same image identified by the hexagons numbered with unique identifier numbers 1 to 37, A to H, and N. Each rendering is different from other renderings by specific amounts of log exposure. The renderings of chart 154 are preferably printed with the same colorants and on the same substrate 158 as will be used for making photographic prints of a reference film strip 160 carrying unprocessed reference images. More particularly, chart 154 is preferably formed by exposing and processing (that is, developing and fixing the image) the same type of photographic paper as will be used for printing images from the reference film strip 160 and from a customer film strip 170. The exposed and processed paper becomes substrate 158 and the dyes in the paper become the image colorants. By the same "type" of a photographic medium (such as paper or film) is meant having the same photographic characteristics, and normally references media manufactured in the same way with the same components. Reference film strip 160 and customer film strip 170 are described below in connection with FIG. 3. By using the same type of photographic media the color gamut, gloss, contrast, and white point of the printed reference images, reference chart, and printed customer images, will be identical and an appearance match between the reference image and reference chart can be obtained regardless of viewing conditions.

The renderings are in two groups, with all the renderings preferably being on a gray background on substrate 158 to reduce chromatic induction effects. A first group of renderings simulates equally spaced printer exposures resulting in a range of lightness at a constant color balance. This first group is on the left side of chart 154, and vary from Lightest to Darkest, lettered from A to H (A being the lightest of the first group, that is the least exposure, and H being the darkest of the first group, that is the greatest exposure). These renderings are separated by equal changes in log exposure, with D being the rendering recommended by the manufacturer of the kit (hence D has what the manufacturer regards as the recommended density for this scene).

The second group, identified by numbers 1 to 37, on the right hand side of chart 154, changes in color balance. The center patch 1 is the recommended color and density (identical to "D" from the left side). Adjacent renderings in a given direction on the chart preferably simulate a constant log exposure difference, such as 0.030 relative log exposure. This difference preferably corresponds to the color correction button increments commonly found on photofinishing optical printers. Thus, all the renderings immediately adjacent to and surrounding a given rendering simulate a constant log exposure offset from that given rendering but in different color directions. The different color balance renderings are achieved by adjusting the relative log exposures in three color dimensions—the red/cyan, green/magenta and yellow/blue axes. For example, in order to make a rendering with a more yellow color balance, the yellow/blue exposure would be increased relative to the red/cyan and magenta/green exposures. The changes to these exposures are made in a way that maintains a constant level of lightness (relative brightness, independent of chromaticity) in the renderings. Lightness and chromaticity can be described, for example, using the CIE L*a*b* color space (see R. W. G. Hunt, The Reproduction of Color Fourth Edition, 1987, Fountain Press, Tolworth, England).

Chart 154 also has a correctly exposed and color balanced rendering N included on the plain gray background of the reference chart to facilitate critical comparison without the distraction of surrounding images. Rendering N is the same as D (which in turn is the same as rendering 1).

It will be appreciated that the log exposure differences between renderings need not be maintained constant, but could be varied to assist in use of the chart with any image output device.

Figure 3:
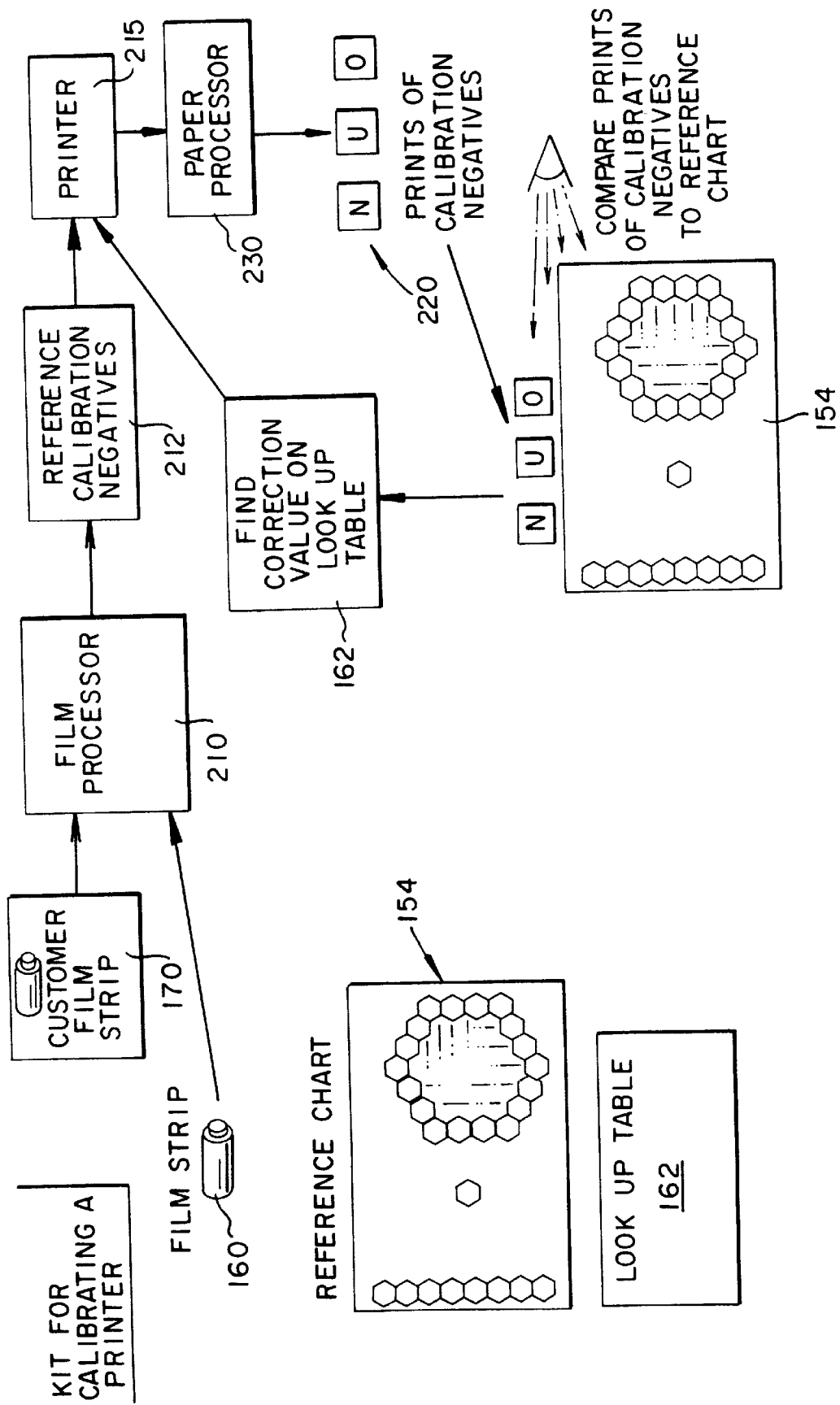
FIG. 3 is a flowchart illustrating a kit of the present invention, and a method of the present invention for calibrating a photofinishing system using such a kit.

Referring to FIG. 3, an apparatus of the present invention and the method of using it for calibrating a photographic printer, are shown. The apparatus is in the form of a kit, and includes reference chart 154, a reference film strip 160, a look up table 162, and an indication that the kit is to be used for establishing a printer calibration for an identified film type or types. By a "kit" is meant that all of the elements of the apparatus are provided together (typically in a single package). The foregoing indication may be in the form of printed instructions associated with the kit (for example, instructions enclosed with the kit or on its packaging) specifying that the kit is for printer calibration for the stated film type or types (preferably for a film type the same as that of the unprocessed reference film strip 160). The kit may additionally comprise an indication that the photographic prints of the reference image are to be made on the same type of photographic medium as the reference chart 154 was made. This indication may be in any of the forms of the previously mentioned indication.

Figure 2:
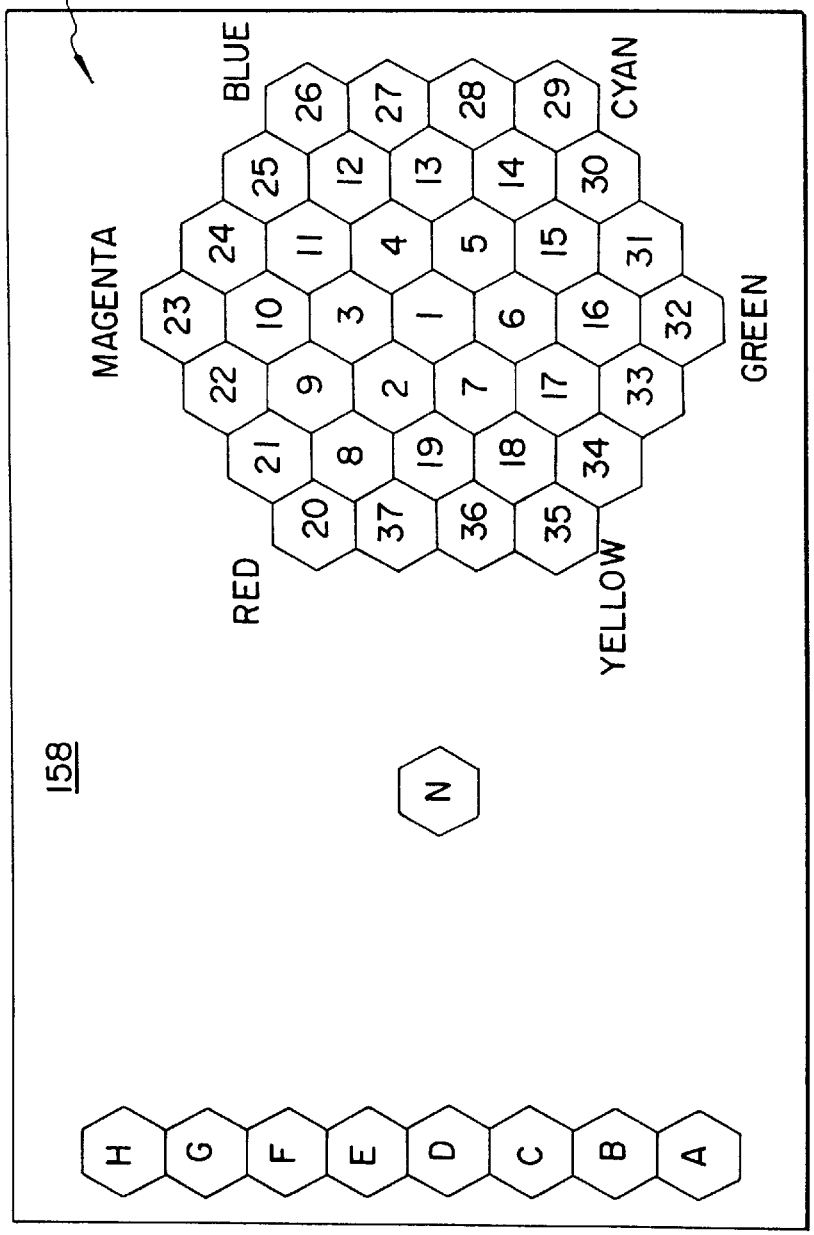
FIG. 2 is a view of a reference chart produced by the method of FIGS. 1A and 1B.

Look up table 162 is shown in the form of the same unique identifiers on reference chart 154, printed in association with corresponding correction factors printed on a paper substrate which are the values for changing the printer output to match a predefined aim rendering (rendering 1 or N, in FIG. 2). The kit enables calibration of the printer for customer images made on the same type of film as the reference film strip. Reference film strip 160 carries latent images (that is, exposed but not processed) of a scene which is suitable for calibrating a printer. This scene would typically contain neutral (that is, one or more gray levels including black and white, which are substantially achromatic) and non-neutral color elements. Preferably the scene would contain multiple objects, and could be a real world scene or computer generated scene. Preferably the scene would include human skin colors and other common colors such as sky blue, green foliage, and the like. Most preferably, the scene will be the same as that in the renderings carried by reference chart 154. Typically, the scene would be exposed onto the reference filmstrip at a number of different exposure levels, providing at least one normally exposed latent image and one or more latent images that are either under exposed or over exposed. For example a typical reference film strip may contain images exposed normally, 2½ stops under exposed, 2½ stops over exposed and 5 stops over exposed. This facilitates calibration of the photographic printer for negatives of different exposure levels as would typically be encountered in customer orders. Preferably the reference film strip 160 is produced using second generation original methods similar to those described in U.S. Pat. Nos. 5,223,891 and 5,313,251.

Look up table 162 consists of one or more sets of printer adjustment factors corresponding to the differences between the various renderings of the reference image (as identified by the unique identifiers) on the reference chart These adjustment factors correspond to changes in the relative exposure levels in the red/cyan, green/magenta or yellow/blue channels of a photographic printer. By using these adjustment factors the photofinisher is able to change the appearance of prints produced by his photographic printer from matching the density or color balance of a particular rendering on the reference chart to matching the density or color balance of any other rendering on the reference chart.

The method of using the kit to calibrate a photographic printer begins with processing of the reference film strip 160 in the film processor 210 of the photofinishing system. The photofinishing system includes a film processor 210, photographic optical printer 215, and paper processor 230 typically all located at the same single location. An advantage of processing the reference film strip at the photofinisher, rather than providing a fully processed film strip in the kit, is that this method accounts for biases that may be present in the film processing operation of the particular photofinishing system. The printer calibration thus obtained will therefore be correct for printing negatives produced using the film processor of the particular photofinishing system rather than simply correct for an 'ideally processed' film negative. Processing the reference film strip in the film processor produces a strip of reference calibration negatives 212. The photofinisher then makes reference prints of the reference calibration negatives 212 using the printer 215 of the photofinishing system. These prints will most preferably be made on the same type of photographic paper that the reference chart is printed on and that customer prints are made on. The reference prints are processed in the paper processor 230 of the photofinishing system. The reference prints 220 are then compared to the reference image renderings on the reference chart 154. Preferably two comparisons are made—one based on image density using the renderings A to H on the reference chart and the other based on color balance using the renderings 1 to 37 on the reference chart. This comparison is preferably made visually, but reference neutral and/or color patches 156 can be included in the reference image to enable comparison using a densitometer. The renderings on the reference chart that match (that is, appear visually to be most similar) the reference prints 220 most closely in density and color balance are noted. The photofinisher also determines the aim reference rendering on the reference chart. This aim is the rendering having the most desirable color balance and density in the opinion of the photofinisher. Typically the aim rendering recommended by the kit manufacturer, is clearly identified on the reference chart and is generally located in the center of the color balance ring around (that is, rendering number 1 in FIG. 2). If the reference images 220 match the aim rendering then the printer is calibrated. If the reference prints do not match the aim rendering then lookup table 162 is used to determine the printer correction factors needed to obtain output from the printer matching the aim rendering. The printer correction factors so obtained are applied to the printer and a new series of reference prints are made from the reference negatives 212 and processed. These new reference prints are again compared to the reference chart as described above. This cycle may be repeated as necessary until the reference prints match the aim rendering on the reference chart.

Once printer calibration is satisfactory customer films 170 of the same type as the reference film strip 160 can be processed in film processor 210 (under the same processing conditions as used for reference film strip 160) and printed using printer 215 onto the same type of photographic paper from which reference chart 154 is made. The printed customer images are then processed in print processor 230 (under the same processing conditions as used for processing the reference prints). In this way, correctly exposed and color balanced customer prints will be obtained.

Since the reference film strip 160 contains under and over exposed images in addition to the normally exposed image, printer under and over slope calibrations can be established to optimally print under and over exposed customer negatives in addition to normally exposed customer negatives.

Various modifications can, of course, be made to the above embodiments. For example, look up table 162, rather than carrying the correction factors in a human readable form on a substrate, could carry the correction factors in the form of only machine readable data carried by a suitable substrate, such as a machine readable magnetic or optical storage medium (for example, a computer diskette) or solid state memory. Of course, the user at a photofinishing lab would need a suitable reader (such as a computer) for this data. The correction factors when in the form of machine readable data, may be just carried by the memory of a computer contained as part of a computer controlled printer. This could thereby allow such a computer controlled printer to determine the necessary correction factor to be applied to a printer after the user has made the visual comparison.

It will also be appreciated that the photographic prints output by printer 215 need not be of the reflection kind (that is, they need not be a photographic paper), but could be of the transparent kind for projection or viewing by transmitted (rather than reflected) light.

The invention has been described with reference to a preferred embodiment However, it will be appreciated that variations and modifications can be effected by a person of ordinary skill in the art without departing from the scope of the invention.

| | PARTS LIST |
|---|---|
| 1–37 | Unique Idenfifier Numbers |
| 102 | Capture Film |
| 104 | Sensitometer |
| 106 | Sensitometer Exposure |
| 108 | Scene |
| 110 | Original Image |
| 112 | Fiim Processor |
| 114 | Sensitometric Exposures |
| 116 | Digital Film Scanner |
| 118 | Digital Image |
| 120 | Digital Data Transform |
| 122 | Digital Image |
| 124 | Digital Transform |
| 126 | Ditigal Image |
| 128 | Second Transform |
| 130 | Digital Image |
| 132 | Digital Transform |
| 134 | Digital Image |
| 136 | Digital Transform |
| 138 | Digital Image |
| 140 | Steps |
| 142 | Digital Image |
| 144 | Step |
| 146 | Digital Transform |
| 148 | Reference Chart |
| 150 | Negative |
| 152 | Step |
| 154 | Chart |
| 156 | Reference Neutral and/or Color Patches |
| 158 | Substrate |
| 160 | Film Strip |
| 162 | Look Up Table |
| 170 | Customer Film Strip |
| 210 | Film Processor |
| 212 | Reference Calibration Negatives |
| 215 | Printer |
| 220 | Reference Prints |
| 230 | Processor |

What is claimed is:

1. A kit for calibrating a printer of a photofinishing system, comprising:

(a) a reference film strip carrying at least one reference image;

(b) a print having a reference chart, said reference chart comprising multiple renderings of the reference image exposures and which include an aim rendering, each rendering having a unique identifier; and (c) a substrate carrying a list of printer correction factors associated with each of said unique identifiers, said renderings are used to visually match a print made from said reference image obtained from said reference film strip after development thereof, said unique identifier of the visually matched rendering is used to find the associated correction factor on said substrate for correcting the set-up of said printer.

2. A kit according to claim 1 wherein the reference film strip carries the reference image as a developed image.

3. A kit according to claim 1 wherein the reference image contains neutral and non-neutral color information.

4. A kit according to claim 1 additionally comprising an indication that the kit is to be used for establishing a printer calibration for an identified film type.

5. A kit according to claim 1 wherein the reference chart carries the multiple renderings on a photographic medium, the kit additionally comprising an indication that photographic prints of the reference image are to be made on a same type of photographic medium as the reference chart.

6. A kit according to claim 1 wherein the reference film strip is a second generation original.

7. A kit according to claim 1 wherein the reference image contains only neutral color information.

8. A kit according to claim 1 wherein the reference chart is produced on developed color photographic paper.

9. A kit for calibrating a printer of a photofinishing system, comprising:
   (a) an exposed and unprocessed reference film strip carrying at least one latent reference image;
   (b) a print having a reference chart, said reference chart comprising multiple renderings of the reference image exposures and which include an aim rendering, each rendering having a unique identifier; and
   (c) a substrate carrying a list of printer correction factors associated with each of said unique identifiers said renderings are used to visually match a print made from said reference image obtained from said reference film strip after development thereof said unique identifier of the visually matched rendering is used to find the associated correction factor on said substrate for correcting the set-up of said printer.

10. A kit according to claim 9 additionally comprising an indication that the kit is to be used for establishing a printer calibration for a film type the same as that of the unprocessed reference film strip.

11. A method of calibrating a photofinishing system using a kit comprising:
   (a) a reference film strip carrying at least one reference image;
   (b) a reference chart carrying multiple renderings of the reference image representing different printer exposures; and
   (c) a substrate carrying printer correction factors needed to change a photographic print obtained from the reference image on the reference film strip, to match any desired rendering on the reference chart;

comprising the steps of:
   (a) making a print of the at least one reference image from the reference film strip using a printer of the photofinishing system;
   (b) comparing the print resulting from step (a) with the multiple renderings on the reference chart, to find a matched rendering on the reference chart;
   (c) determining the printer correction factor from the factors on the substrate corresponding to the matched rendering from step (b) and an aim rendering; and
   (d) adjusting the printer in accordance with the printer correction factor identified in step (c).

12. A method according to claim 11 wherein the reference chart is carried on a photographic medium, and the print of the reference image is made on the same type of photographic medium on which the reference chart is carried.

13. A method of calibrating a photofinishing system using a kit, comprising:
   (a) an exposed and unprocessed reference film strip carrying at least one latent reference image;
   (b) a print having a reference chart, said reference chart comprising multiple renderings of the reference image exposures and which include an aim rendering, each rendering having a unique identifier; and
   (c) a substrate carrying a list of printer correction factors associated with each of said unique identifiers, said renderings are used to visually match a print made from said reference image obtained from said reference film strip after development thereof, said unique identifier of the visually matched rendering is used to find the associated correction factor on said substrate for correcting the set-up of said printer, comprising the steps of:
   (a) developing the at least one latent reference image on the reference film strip, in a film developing process of the photofinishing system;
   (b) making a print of a developed reference image from step (a) using a printer of the photofinishing system;
   (c) comparing the print resulting from step (b) with the multiple renderings on the reference chart, to find a matched rendering on the reference chart;
   (d) determining a printer correction factor from a factor on the substrate corresponding to the matched rendering from step (c) and an aim rendering; and
   (e) adjusting the printer in accordance with the printer correction factor identified in step (d).

14. A method according to claim 13 additionally comprising developing further latent images on a same film type as the reference film strip using a same film developing process of the photofinishing system, and printing the developed further latent images on a same printer of the photofinishing system after adjusting the printer according to step (e).

* * * * *